USO10594242B2

(12) United States Patent
Eguchi

(10) Patent No.: US 10,594,242 B2
(45) Date of Patent: Mar. 17, 2020

(54) MOTOR CONTROLLER

(71) Applicant: OKUMA Corporation, Niwa-gun, Aichi (JP)

(72) Inventor: Satoshi Eguchi, Aichi (JP)

(73) Assignee: OKUMA CORPORATION, Niwa-Gun, Aichi (JP)

( * ) Notice: Subject to any disclaimer, the term of this patent is extended or adjusted under 35 U.S.C. 154(b) by 0 days.

(21) Appl. No.: 16/261,979

(22) Filed: Jan. 30, 2019

(65) Prior Publication Data

US 2019/0238079 A1 Aug. 1, 2019

(30) Foreign Application Priority Data

Jan. 31, 2018 (JP) .................. 2018-015733

(51) Int. Cl.
*H02P 1/00* (2006.01)
*H02P 1/28* (2006.01)
*H02P 3/00* (2006.01)
*H02P 7/06* (2006.01)
*H02P 21/22* (2016.01)
*H02P 27/08* (2006.01)

(52) U.S. Cl.
CPC ............. *H02P 21/22* (2016.02); *H02P 27/08* (2013.01)

(58) Field of Classification Search
CPC ........................................................ H02P 21/22
USPC ......................................................... 318/504
See application file for complete search history.

(56) References Cited

U.S. PATENT DOCUMENTS

| 2011/0025238 A1* | 2/2011 | Ueda | B62D 5/046 318/400.02 |
| 2013/0141023 A1* | 6/2013 | Sugita | H02P 21/0003 318/400.02 |
| 2014/0312812 A1* | 10/2014 | Sasaki | H02P 21/0003 318/400.02 |

* cited by examiner

*Primary Examiner* — Erick D Glass
(74) *Attorney, Agent, or Firm* — Cantor Colburn LLP

(57) ABSTRACT

A controller for a motor determines a voltage limit circle based on a velocity of the motor, a DC bus voltage of an inverter, calculates a q axis current limit value based on the voltage limit circle and a predetermined current limit circle, determines, as a q axis current command value, a value obtained through a limit process which is applied using the q axis current limit value to a q axis current value calculated in accordance with a torque command value, and determines a corresponding d axis current value based on the q axis current command value.

6 Claims, 11 Drawing Sheets

MOTOR CONTROLLER

CROSS REFERENCE TO RELATED APPLICATION

The present application claims priority under 35 U.S.C. § 119 to Japanese Patent Application No. 2018-015733 filed on Jan. 31, 2018, which is incorporated herein by reference in its entirety including the specification, claims, drawings, and abstract.

TECHNICAL FIELD

The present disclosure relates to a current control technique for computing and controlling, in a motor controller (such as, for example, a controller employed in a feed axis of an NC machine tool or the like to control a velocity and a rotation angle (position) of the motor), a current of a motor using a two-phase rotating coordinate system (in which a magnetic polarity direction is generally referred to as a d axis, and a direction electrically orthogonal to the magnetic polarity direction is generally referred to as a q axis).

BACKGROUND

To reliably perform urgent stop at the time of occurrence of an emergency, a permanent magnet synchronous motor (hereinafter, referred to as a "motor") is often employed in a feed axis of an NC machine tool by virtue of the characteristic feature of the motor capable of producing a great braking force merely by establishing a short circuit in windings during rotation. Meanwhile, a PWM inverter is typically used as a power converter in a controller for controlling the velocity and a rotation angle (position) of the motor.

Conventionally, in controllers for controlling the velocity and the rotation angle (position) of permanent magnet synchronous motors by means of PWM inverters, voltages of the motors have been suppressed by supplying a d axis current in accordance with voltage constraints resulting from the velocity of the motors and from DC bus voltages of the inverters. However, a q axis current has been controlled using a q axis current limit value which is based on N-τ (velocity-torque) characteristics of the motors, and has not been controlled in consideration of the voltage constraints.

FIG. 11 is a block diagram showing an example configuration of a velocity controller 200 illustrated as an example of a controller for a three-phase permanent magnet synchronous motor in related art. The velocity controller 200 according to this example will be described below. Firstly, a PWM inverter, to which an AC voltage of a three-phase AC power source 100 is input, rectifies the AC voltage in a converter section 101, smooths the rectified AC voltage in a large capacitor 102, and converts the rectified AC voltage into a DC voltage. The converted DC voltage, which is referred to as a DC bus voltage Vdc, varies depending on an amplitude of the AC voltage of the three-phase AC power source 100.

An inverter section 103 is composed of power semiconductors which establish a bridge between DC buses for each of U, V, and W phases, and is configured to control a three-phase permanent magnet synchronous motor 104 with a desired time variant voltage which is obtained by adjusting ON time periods of an upper semiconductor and a lower semiconductor in the bridge. A position detector 105 detects a rotation angle of the motor, and current detectors 106u and 106w detect a U-phase current and a W-phase current, respectively.

A velocity command value ωm* is output from a host device (not illustrated) to the velocity controller 200 of this example. A motor rotation angle θm output from the position detector 105 is time-differentiated in a differentiator 51, and a resulting time differential value is output as a motor velocity ωm. It should be noted that a reference letter s in the differentiator 51 denotes a differential operator in a Laplace transform operation. The motor velocity ωm is subtracted from the velocity command value ωm* in a subtracter 50 to obtain a velocity deviation value. The velocity deviation value output from the subtracter 50 is amplified through a proportional integration operation in a velocity control unit 52, and then output as a motor torque command value τc*.

In the configuration, a subsequent control block is represented with a two-phase (d axis, q axis) coordinate system which has been well known. A torque-current convertor 53 is a converter for converting the torque command value τc* into a q axis (torque) current, and a reference symbol Ke in the torque-current convertor 53 represents a motor torque constant. Accordingly, the torque current converter 53 functions as a q axis current calculating section which determines a q axis current value based on the torque command value τc*.

A current vector computing section 80 computes and outputs a q axis current command value iq* and a d axis current command value id*. In a q axis current limiter 81, an output from the torque current converter 53 is further processed in consideration of the N-τ (velocity-torque) characteristic of the motor by performing limit processing on a q axis current command so as to limit a torque command depending on the motor velocity ωm during high-velocity operation. It should be noted that a q axis current limit Iq_lim is in negative correlation with the motor velocity ωm. An output from the q axis current limiter 81 is the q axis current command value iq*.

On the other hand, a d axis current is controlled by a command along a direction of reducing an induced voltage of the motor in order to avoid occurrence of voltage saturation during high velocity rotation. A DC bus voltage detecting section 54 detects in real time a DC bus voltage Vdc, and outputs a detected DC bus voltage change value Δdc which is a difference between the detected DC bus voltage Vdc and a predetermined reference voltage. A d axis current command generating section 82 computes a voltage allowance in control of rotation of the motor based on the induced voltage generated by permanent magnets and the detected DC bus voltage change value Δdc at the motor velocity ωm, and outputs a d axis current command value id* based on the voltage allowance.

A U phase current iu and a W phase current iw supplied to the motor are detected in the current detectors 106u and 106w. It should be noted that a V phase current iv can be calculated by an equation of iv=-(iu+iw). An electrical rotation angle θre of the motor is computed in a converter 55 by multiplying a mechanical rotation angle θm of the motor by the number of pole pairs p. A three phase→dq converting section 57 computes a d axis current detection value id and a q axis current detection value iq from the electrical rotation angle θre of the motor, the U phase current iu, and the W phase current iw by means of coordinate conversion, and outputs the computed values id and iq.

A subtracter 58 subtracts the d axis current detection value id from the d axis current command value id*, and a subtracter 59 subtracts the q axis current detection value iq from the q axis current command value iq*. Subtracted results output from the subtracters 58 and 59 are a d axis current error and a q axis current error which are supplied as inputs to a current controlling unit 60. The current controlling unit 60 includes an error amplifier which amplifies each of the current errors of the axes through a proportional integral operation to perform matching of the current command value and the current detection value for each of the axes, and also includes a compensation controlling unit which decouples currents of the axes, to thereby obtain a d axis voltage command value vd* and a q axis voltage command value vq* which are output from the current controlling unit 60. It should be noted that an electrical angular velocity wre is supplied as a signal obtained by differentiating the electrical rotation angle θre of the motor with respect to time in a differentiator 56, and is used for decoupling control in the current controlling unit 60.

A dq→three phase converting section 61 receives, as inputs, the electrical rotation angle θre of the motor, the d axis voltage command value vd*, and the q axis voltage command value vq*, and outputs a U phase voltage command value vu*, a V phase voltage command value vv*, and a W phase voltage command value vw*. A PWM signal computing section 62 controls the ratio between ON time periods of the upper semiconductor and the lower semiconductor of the bridge in the inverter section 103 in order to output voltages in accordance with magnitude of the phase voltage command values as motor phase voltages. ON/OFF commands supplied to the semiconductors are referred to as PWM signals (a total of six PWM signals are supplied).

As explained above, the controller in the related art computes the voltage allowance in response to a change in the DC bus voltage, and determines the d axis current command value id* in accordance with the voltage allowance. However, in the controller, only a limit is applied to the q axis current command value iq* in consideration of the N–τ (velocity-torque) characteristic of the motor, but no real-time voltage constraint is taken into consideration to determine the q axis current command value iq*. For this reason, there has been a case where a torque in accordance with a command cannot be generated due to the voltage constraint in a power running state at high velocity, or on the contrary, a case where a maximum torque which can be produced in principle by a motor cannot be obtained from the motor due to the presence of an excessive limitation.

In consideration of such circumstances, the present disclosure discloses a motor controller capable of maximizing an output torque of the motor during high-velocity rotation with an increased degree of efficiency.

SUMMARY

A motor controller disclosed herein is a controller in which a current supplied via an inverter to a motor is determined through an operation using a two phase rotating coordinate system, the motor controller including a q axis current calculator which calculates a q axis current value in accordance with a torque command value, and a current vector controller which computes a q axis current command value and a d axis current command value based on the q axis current value, a velocity of the motor, and a DC bus voltage of the inverter. In the motor controller, the current vector controller is configured to determine, based on the velocity of the motor and the DC bus voltage, a voltage limit circle which represents, on a d-q plane, current limit values defined by a voltage constraint resulting from the DC bus voltage, calculate a q axis current limit value based on both the voltage limit circle and a predetermined current limit circle which represents, on the d-q plane, current limit values defined by a current constraint of the motor, determine, as a q axis current command value, a value obtained through limit processing which is applied using the q axis current limit value to the q axis current value calculated in the q axis current calculator, and determine a corresponding d axis current command value based on the q axis current command value.

In addition, the current vector controller is further configured to detect the DC bus voltage of the inverter to find a change in the DC bus voltage, convert the found change in the DC bus voltage into a change of an electrical angular velocity to thereby identify a voltage limit circle corresponding to a changed electrical angular velocity, determine an operating point on a current vector defined by the identified voltage limit circle and a q axis, compute a q axis current limit value Iq_max from the operating point, and simultaneously compute a q axis current command value iq* and a d axis current command value id*.

When the q axis current limit value Iq_max is determined in accordance with the voltage constraint which takes the change in the DC bus voltage of the inverter into consideration, to optimally find the q axis current command value iq* and the d axis current command value id*, both an increased output torque during high-velocity rotation and high-efficiency control can be achieved. In addition, conversion of the change in the DC bus voltage into the change in the electrical angular velocity can contribute to elimination of real-time calculation of electrical angular velocity parameters ($\omega a$, $\omega b$, $\omega c$) on a current vector limit chart.

BRIEF DESCRIPTION OF DRAWINGS

An embodiment of the present disclosure will be described with reference to the following figures, wherein.

DESCRIPTION OF EMBODIMENT

Hereinafter, an embodiment of the present disclosure will be described. First, principles of calculation of a q axis current command value iq* and a d axis current command value id* according to this embodiment will be described with reference to FIG. 10.

Figure 11:
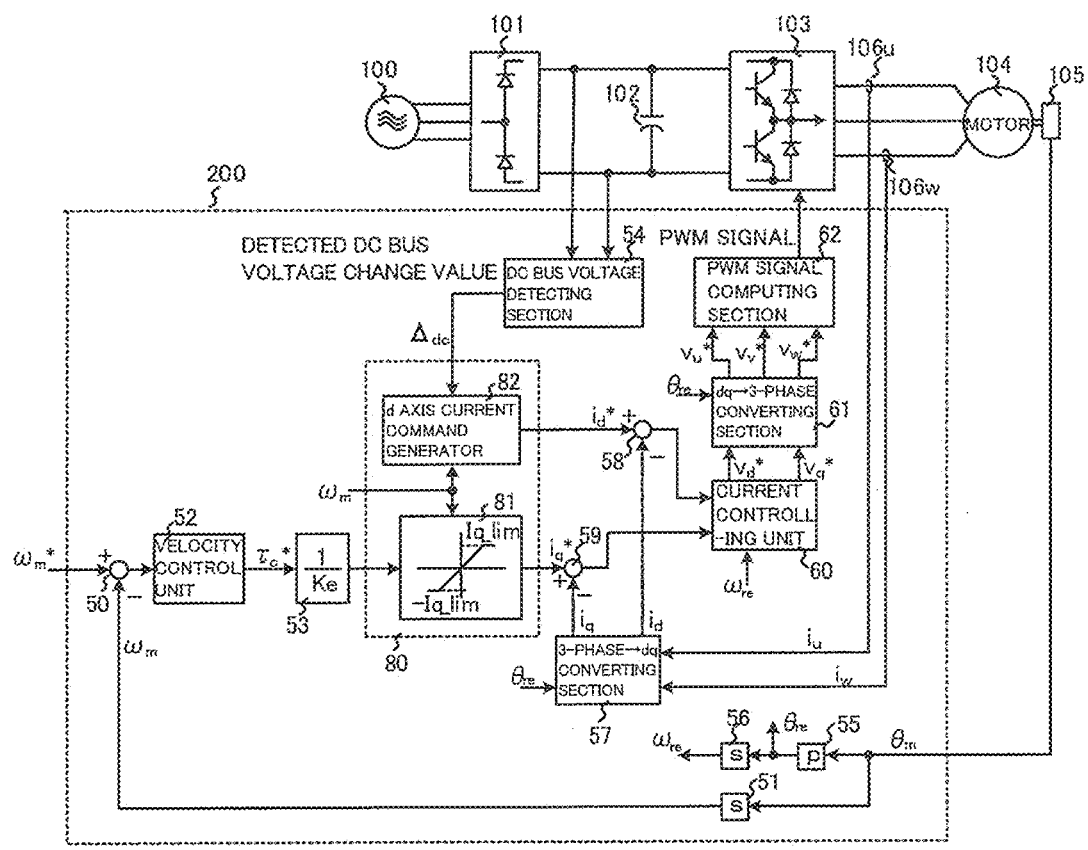
FIG. 11 is a block diagram showing an example configuration of a controller for a permanent magnet synchronous motor in the related art.

A well-known equation for a (d, q) axis coordinate system voltage of a permanent magnet synchronous motor will be described in Equation (1). Here, as has been well known, an induced voltage constant Ke contained in the following equation agrees with a torque constant Ke in a torque current converter 53 (see FIG. 1 and FIG. 11).

[Equation 1]

$$\underbrace{\begin{bmatrix} v_d \\ v_q \end{bmatrix}}_{V} = \underbrace{\begin{bmatrix} R+PL & 0 \\ 0 & R+PL \end{bmatrix}}_{Z} \underbrace{\begin{bmatrix} i_d \\ i_q \end{bmatrix}}_{I} + \underbrace{\begin{bmatrix} -\omega_{re}L i_q \\ \omega_{re}L i_d + Ke\omega_m \end{bmatrix}}_{V_D} \quad (1)$$

where $v_d$: d axis voltage, $v_q$: q axis voltage, id: d axis current, iq: q axis current P: differential operator, R: resistance, L: inductance $\omega_m$: motor velocity (mechanical angle), $\omega_{re}$: electrical angular velocity Ke: induced voltage constant A PWM inverter is subjected to a current constraint resulting from an allowable current carrying capacity of a power semiconductor or other factors. The current constraint is expressed by Equation (2) as follows.

[Equation 2]

$$\begin{cases} Is_{max} = \sqrt{\frac{2}{3}} I_{0max} & (2a) \\ I_{0max} \geq |I_0| = \sqrt{i_q^2 + i_d^2} & (2b) \end{cases}$$

where $Is_{max}$: allowable phase current (u, v, w) limit value $I_{0max}$: current limit value in (d, q) coordinate system corresponding to $Is_{max}$ Meanwhile, in order to control rotation of the motor using the PWM inverter, a DC bus voltage Vdc and a voltage vector V in Equation (1) are required to satisfy a relationship expressed by the following Equation (3).

[Equation 3]

$$\begin{cases} V_{dc} \geq \sqrt{3}\, Vs_{max} = \sqrt{3}\sqrt{\frac{2}{3}} V_{max} = \sqrt{2}\, V_{max} & (3a) \\ V_{max} \geq |V| = \sqrt{V_q^2 + V_d^2} & (3b) \end{cases}$$

where Vdc: DC bus voltage $Vs_{max}$: phase voltage (u, v, w) limit value corresponding to $V_{dc}$ $V_{max}$: voltage limit value in (d, q) coordinate system corresponding to $Vs_{max}$ The above equation denotes that it is necessary for motor control that the magnitude |V| of the voltage in the (d, q) coordinate system should be suppressed so as to be smaller than or equal to $(1/\sqrt{2})$ of the DC bus voltage $V_{dc}$. Here, taking a current vector I in Equation (1) as a DC quantity and excluding an amount of voltage drop caused by a resistance R, a voltage limit value $V_{0max}$ can be expressed by Equation (4) as follows.

[Equation 4]

$$V_{0max} = V_{max} - R \cdot I_{0max} \quad (4)$$

In addition to satisfying the current constraint expressed by Equation (2), the voltage vector $V_0$ in Equation (1) should be maintained at or below the voltage limit value $V_{0max}$ expressed by Equation (4) in order to control rotation of the motor as commanded. Therefore, the current Vector I must satisfy a condition of $|V_0|=V_{0max}$; i.e. $|V_0| \leq -R \cdot I_{0max}$ in addition to meeting a requirement of the current constraint in Equation (1).

Figure 10:
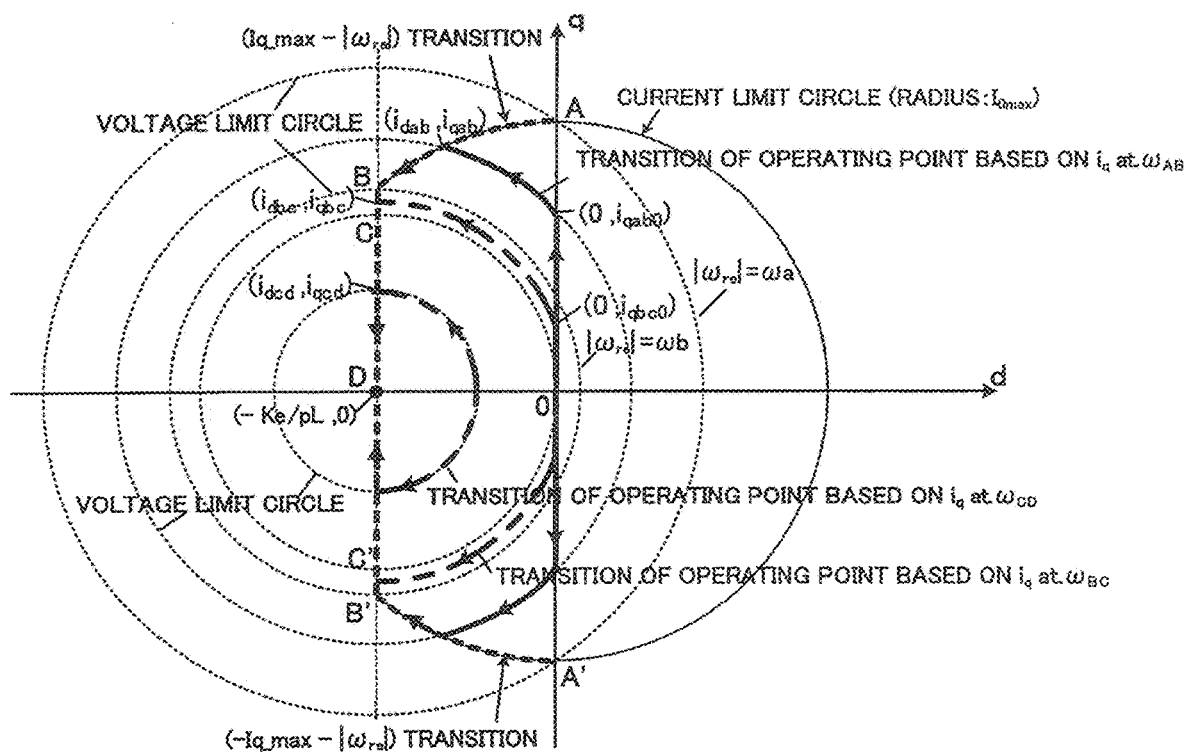
FIG. 10 is a current vector limit chart representing a control range of a current vector of the permanent magnet synchronous motor.

FIG. 10 is a current vector limit chart representing a control range of the current vector I of the permanent magnet synchronous motor. From the voltage vector $V_0$ in Equation (1), a voltage constraint can be expressed by Equation (5) as follows.

[Equation 5]

$$\left(\frac{V_{0max}}{\omega_{re}L}\right)^2 = \left(\frac{Ke}{pL} + i_d\right)^2 + i_q^2 \quad (5)$$

Because the electrical angular velocity ωre equals the motor velocity ωm multiplied by the number of pole pairs p (ωre=p·ωm), Equation (5) represents a voltage limit circle whose diameter gradually becomes smaller as the motor velocity ωm increases. The voltage limit circle is a circle representing current limit values determined from the voltage constraint caused by the DC bus voltage. In FIG. 10, thin dotted circles represent voltage limit circles which vary depending on values of |ωre|. Further, in FIG. 10, a thin solid line represents a current limit circle. The current limit circle is a circle representing, on a d-q plane, current limit values determined from the current constraint of the motor. A control region of the current vector I lies within an internal region defined by an overlap between the current limit circle and the voltage limit circle, and in the control region, the d axis current id is controlled in a range of (−Ke/pL)≤id≤0 in order to suppress a motor voltage with a high degree of efficiency.

At the electrical angular velocity ωre in a range of |ωre|<ωa, because there is no voltage constraint, the d axis current id may be considered as id=0, and only the q axis current is controlled on the q axis. At the electrical angular velocity ωre in a range of ωa≤|ωre|, because the voltage constraint is applied, the voltage is under constraints of both the current limit circle and the voltage limit circles. For example, in FIG. 10, a thick solid line represents transition of an operating point at the electrical angular velocity ωre of |ωre|=ωab (where ωa≤ωab<ωb). When |ωre|=ωab, as shown in FIG. 10, the voltage limit circle (the second thin dotted circle from the outside) intersects with the q axis at coordinates (0, iqab0) and (0, −iqab0), and also intersects with the current limit circle (the thin solid circle) at coordinates (idab, iqab) and (idab, −iqab). Because of this, when iq<iqab0 is satisfied, the d axis current id may be 0. However, when the relationship of iq≥iqab0 is established, the voltage vector reaches the voltage constraint, which causes the operating point to transition from the coordinates (0, iqab0) toward the coordinates (idab, iqab) on the voltage limit circle. When the relationship changes to iq>iqab, supplying the q axis current ip is not allowed due to the current constraint.

At the electrical angular velocity ωre in a range of ωb≤|ωre|, because the voltage limit circle is located within the current limit circle, the voltage limit circle is employed as the constraint. In FIG. 10, a thick dotted-dashed line represents transition of the operating point at the electrical angular velocity ωre in a range of |ωre|=ωbc (where ωb≤ωbc<ωc). When |ωre|=ωbc, the q axis current iq in a range of iq<iqbc0 can be controlled under a condition of id=0 with the operating point on the voltage limit circle until the q axis current iq reaches a range of iq≤iqbc. At the electrical angular velocity in a range of ωc≤|ωre|, as shown by a double-dotted thick dashed line in FIG. 10, because the voltage constraint is applied even when iq=0, the d axis current id is in a range of id<0 in the entire region. Therefore, the q axis current iq can be controlled along the voltage limit circle until reaching a range of iq≤iqcd.

In FIG. 10, a thick dotted line represents transition of a q axis current limit value Iq_max. The q axis current limit value Iq_max gradually decreases as the electrical angular velocity ωre increases. An operating line (load line) of the q axis current limit value Iq_max transitions from A→B→C→D in the current vector limit chart when the q axis current iq is of a positive sign. On the other hand, when the q axis current iq is of a negative sign, the q axis current limit value Iq_max transitions from A'→B'→C'→D' in the current vector limit chart. That is, a q axis coordinate value having the greatest absolute value among those of the q axis coordinates in the internal region where the voltage limit circle overlaps with the current limit circle is taken as the q axis current limit value Iq_max. A value obtained through limit processing performed using the q axis current limit value Iq_max on the q axis current value calculated in accordance with the torque command value is used as a q axis current command value iq*. On the other hand, for a d axis current command value id*, a point whose q axis coordinate value matches the q axis current command value iq* and whose d axis coordinate value has the smallest absolute value among those of the d axis coordinates in the internal region where the voltage limit circle overlaps with the current limit circle is determined, and a d axis coordinate value of the determined point is taken as the d axis current command value id*.

In this embodiment, the q axis current limit value Iq_max is computed based on the voltage constraint which is determined in consideration of a change in the DC bus voltage of the inverter represented by the above-described voltage limit circle, and the q axis current command value iq* and the d axis current command value id* are subsequently determined based on the computed q axis current limit value Iq_max, to thereby maximize the output torque and increase the degree of efficiency during high-velocity rotation of the motor.

Figure 1:
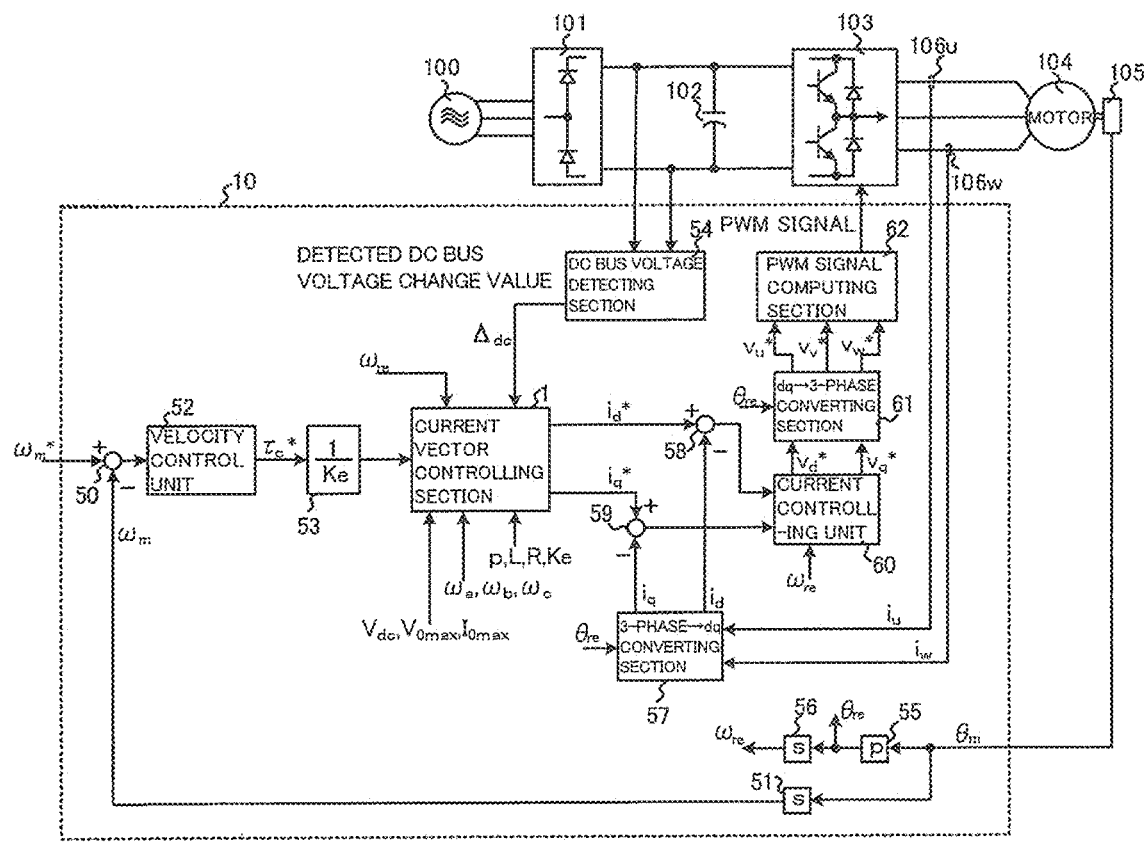
FIG. 1 is a block diagram showing an example configuration of a controller for a permanent magnet synchronous motor.

Next, with reference to FIG. 1, a velocity controller 10 for a three-phase permanent magnet synchronous motor according to this embodiment will be explained. FIG. 1 is a block diagram showing a structure of the velocity controller 10 for the three-phase permanent magnet synchronous motor in this embodiment. Only different components which are not explained above in connection with the example of the velocity controller in related art will be described below.

The velocity controller 10 is composed, for example, of a microcomputer including a CPU and a memory. Alternatively, the velocity controller 10 may be composed of an electric circuit which performs computation in accordance with predetermined procedural steps, or a combination of two or more such electric circuits. In the velocity controller 10, an output from a torque current converter 53 is supplied as an input to a current vector controlling section 1. It should be noted that the output from the torque current converter 53 is a q axis current command value in a stage before application of the limit processing. A voltage constraint expression can be described with the voltage limit circle defined by Equation (5). As is evident from Equation (5), the size (radius) of the voltage limit circle is inversely proportional to the electrical angular velocity ωre (the motor velocity ωm), and is proportional to the voltage limit value $V_{0max}$. From Equations (3a) and (4), it is found that a change $\Delta dc$ in the DC bus voltage Vdc and a change $\Delta V_{0max}$ in the voltage limit value $V_{0max}$ have a relationship described by Equation (6) as follows.

[Equation 6]

$$\Delta V_{0max} = \frac{\Delta_{dc}}{\sqrt{2}} \quad (6)$$

Therefore, a voltage limit value $V_{0max\_V}$ incorporating the voltage changes is defined for each operation at power running and at regenerative running as follows.

[Equation 7]

$$\begin{cases} V_{0max\_v} = V_{0max} + \Delta V_{0max} = V_{0max} + \frac{\Delta_{dc}}{\sqrt{2}}: & \text{FOR POWER RUN} \\ V_{0max\_v} = V_{0max} + R \cdot I_{0max} + \Delta V_{0max} = & \text{FOR REGENERATIVE} \\ V_{0max} + R \cdot I_{0max} + \frac{\Delta_{dc}}{\sqrt{2}}: & \end{cases} \quad (7)$$

Here, for the voltage limit value $V_{0max\_V}$, Equation (8) is established as follows.

[Equation 8]

$$\frac{V_{0max\_v}}{\omega_{re}} = \frac{V_{0max}}{\frac{V_{0max}}{V_{0max\_v}}\omega re} = \frac{V_{0max}}{\omega_{re\_v}} \quad (8)$$

Therefore, the operating point on the current vector limit chart can be determined by converting the electrical angular velocity ωre_v using Equation (9) into the electrical angular velocity ωre_v in which the voltage changes are taken into account, and subsequently selecting the voltage limit circle using the electrical angular velocity ωre_v.

[Equation 9]

$$\omega_{re\_v} = \frac{V_{0max}}{V_{0max\_v}} \omega_{re} \qquad (9)$$

In the current vector controlling section 1, the number of pole pairs p, the winding inductance L, the winding resistance R, and the induced voltage constant Ke, which are motor parameters, the DC bus reference voltage Vdc, the reference voltage limit value $V_{0max}$, and the current limit value $I_{0max}$, which are determined based on the rating of the PWM inverter or other factors, and electrical angular velocity parameters ωa, ωb, and ωc representing electrical angular velocities on the current vector limit chart are preset and stored in the memory. The electrical angular velocity parameters ωa, ωb, and ωc indicate boundary values of the electrical angular velocity ωre_v at which calculation equations for the q axis current command value iq* and the d axis current command value id* are changed. From the preset values, the electrical angular velocity ωre of the motor varying in real time, and the detected DC bus voltage change value Δdc, the current vector controlling section 1 determines the operating point on the current vector limit chart based on a computation algorithm which will be explained below, and computes, based on the determined operating point, the q axis current command value iq* and the d axis current command value id*, which are then output.

Figure 2:
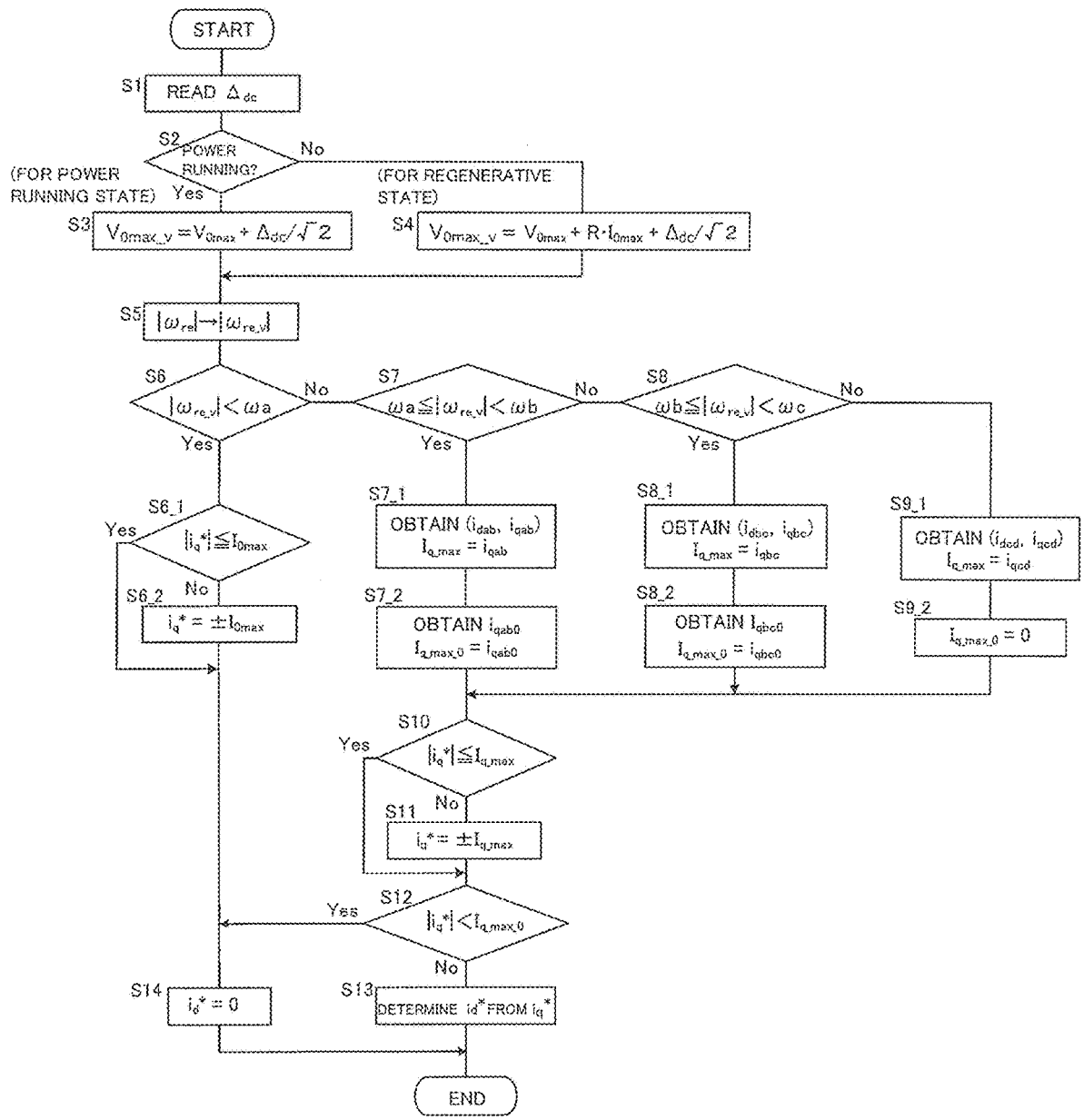
FIG. 2 is a flowchart for explaining a computation algorithm executed by a current vector controlling section in the controller for the permanent magnet synchronous motor.

FIG. 2 is a flowchart for explaining the computation algorithm employed in the current vector controlling section 1 of the velocity controller 10. First, in step S1, the current vector controlling section 1 reads the detected DC bus voltage change value Δdc. In step S2, the current vector controlling section 1 determines whether an operating state of the motor is a power running state or a regenerative state. For example, the operating state of the motor is determined as the power running state when the motor velocity ωm and a motor acceleration have values of the same sign, or determined as the regenerative state when they have values of opposite sign. Operation proceeds to step S3 when the power running state is determined, or proceeds to step S4 when the regenerative state is determined, and in either step, the current vector controlling section 1 computes, based on Equation (7), the voltage limit value $V_{0max\_v}$ incorporating the voltage change. Operation further proceeds to step S5 where the current vector controlling section 1 converts, based on Equation (9), the electrical angular velocity ωre into the electrical angular velocity ωre_v which takes the voltage change into account.

From steps S6 to S8, a domain of the operating point is determined on the current vector limit chart. The quantity ωa is an electrical angular velocity parameter indicative of an electrical angular velocity which is smallest among those subjected to the voltage constraint at a reference voltage, and a voltage limit circle of the electrical angular velocity passes through the point A (or A') on the current vector limit chart in FIG. 10. The electrical angular velocity parameter ωa is determined by Equation (10) described below. In step S6, the current vector controlling section 1 determines whether or not an absolute value |ωre_v| of the electrical angular velocity lies within a range of |ωre_v|<ωa.

[Equation 10]

$$\omega a = \frac{V_{0max}/L}{\sqrt{(Ke/pL)^2 + I_{0max}^2}} \qquad (10)$$

If the absolute value |ωre_v| is in the range of |ωre_v|≥ωa, operation proceeds to step S7 where the current vector controlling section 1 determines whether or not the absolute value |ωre_v| lies within a range of ωa≤|ωre<ωb. The quantity ωb is an electrical angular velocity parameter indicative of an electrical angular velocity which is smallest among those associated with voltage limit circles located within the current limit circle at the reference voltage, and a voltage limit circle of the electrical angular velocity passes through the point B (or B') on the current vector limit chart in FIG. 10. The electrical angular velocity parameter ωb is determined by Equation (11) as follows.

[Equation 11]

$$\omega b = \frac{V_{0max}/L}{\sqrt{I_{0max}^2 - (Ke/pL)^2}} \qquad (11)$$

If the absolute value |ωre_v| is in the range of |ωre_v|≥ωb, operation proceeds to step S8 where the current vector controlling section 1 determines whether or not the absolute value |ωre_v| lies within a range of ωb≤|ωre_v|<ωc. The quantity ωc is an electrical angular velocity parameter indicative of an electrical angular velocity which is smallest among those subjected to the voltage constraint even when the q axis current iq equals 0, and a voltage limit circle of the electrical angular velocity passes through the point C (or C') on the current vector limit chart in FIG. 10. The electrical angular velocity parameter we is determined by Equation (12) as follows.

[Equation 12]

$$\omega c = \frac{V_{0max}}{(Ke/p)} \qquad (12)$$

If the absolute value |ωre_v| is in the range of |ωre_v<ωa (Yes is determined in step S6), the motor velocity has not reached the electrical angular velocity subjected to the electrical constraint. In a domain of this range, control can be performed with the d axis current id=0, while the q axis current iq can be supplied unless a value of the q axis current iq exceeds the current limit value $I_{0max}$. In step S6_1, an absolute value |iq*| of the q axis current command value is compared with the current limit value $I_{0max}$, and when |iq*|>$I_{0max}$ is determined, operation proceeds to step S6_2 where the limit processing is performed on the q axis current command value iq* using the current limit value $I_{0max}$. For the d axis current command value id*, id*=0 is set and output in step S14.

If the absolute value |ωre_v| is in the range of ωa≤|ωre_v|<ωb (Yes is determined in step S7), it becomes necessary that the d axis current id be determined in accordance with the q axis current iq. The q axis current limit is defined by a point of intersection (idab, iqab) of a voltage limit circle existing in an A-B section and the current limit circle in the current vector limit chart in FIG. 10, and is calculated by Equation (13) as follows.

[Equation 13]

$$\begin{cases} i_{dab} = \dfrac{\{V_{0max}/(\omega_{re\_v}L)\}^2 - (Ke/pL)^2 - I_{0max}^2}{2(Ke/pL)} \\ i_{qab} = \sqrt{I_{0max}^2 - i_{dab}^2} \end{cases} \quad (13)$$

Here, the q axis current iq which causes application of the voltage constriction matches iqab0 from a point of intersection (0, iqab0) of the voltage limit circle and the q axis, and is calculated by Equation (14) as follows.

[Equation 14]

$$i_{qab0} = \sqrt{\{V_{0max}/(\omega_{re\_v}L)\}^2 - (Ke/pL)^2} \quad (14)$$

In step S7_1, the current vector controlling section 1 assigns a value of iqab calculated by Equation (13) to the q axis current limit value Iq_max. In step S7_2, the current vector controlling section 1 assigns a value of iqab0 calculated by Equation (14) to a voltage limit starting q axis current Iq_max_0. The voltage limit starting q axis current Iq_max_0 represents a maximum value of the q axis current command value iq* which allows setting of the d axis current command value id*=0. When the q axis current command value iq* exceeds the value of the voltage limit starting q axis current Iq_max_0, the d axis current command value id* becomes |id*|>0.

In a case where the absolute value |ωre_v| satisfies a relationship of ωb≤|ωre_v|<ωc, (Yes is determined in step S8), the d axis current id is also determined in accordance with the q axis current iq. The q axis current limit is defined by a point of intersection (idbc, iqbc) of a voltage limit circle existing in a B-C section and a line defined by id=-Ke/pL (line passing through the center of the voltage limit circle in parallel with the q axis) in the current vector limit chart of FIG. 10, and calculated by Equation (15) as follows.

[Equation 15]

$$\begin{cases} i_{dbc} = -(Ke/pL) \\ i_{qbc} = V_{0max}/(\omega_{re\_v}L) \end{cases} \quad (15)$$

In this case, the q axis current iq which causes application of the voltage constraint matches iqbc0 at a point of intersection (0, iqbc0) of the voltage limit circle and the q axis, and calculated by Equation (16) as follows.

[Equation 16]

$$i_{qbc0} = \sqrt{i_{qbc}^2 - (Ke/pL)^2} \quad (16)$$

In step S8_1, the current vector controlling section 1 assigns a value of the iqbc calculated by Equation (15) to the q axis current limit value Iq_max. In step S8_2, the current vector controlling section 1 assigns a value of the iqbc calculated by Equation (16) to the voltage limit starting q axis current Iq_max_0.

If the absolute value |ωre_v| satisfies a relationship of |ωre_v|≥ωc (No is determined in step S8), the voltage constraint is applied even when the q axis current iq is 0, which means that it is necessary to use the d axis current id for control operation. A value of the q axis current limit is defined by a point of intersection (idcd, iqcd) of the voltage limit circle existing in a C-D section and the line defined by id=-Ke/pL (line passing through the center of the voltage limit circle in parallel with the q axis), and is calculated by Equation (17) as follows.

[Equation 17]

$$\begin{cases} i_{dcd} = -(Ke/pL) \\ i_{qcd} = V_{0max}/(\omega_{re\_v}L) \end{cases} \quad (17)$$

In step S9_1, the current vector controlling section 1 assigns a value of the iqcd calculated by Equation (17) to the q axis current limit value Iq_max. Then, in step S9_2, the current vector controlling section 1 sets Iq_max_0=0 as the voltage limit starting q axis current Iq_max_0.

If the absolute value |ωre_v| satisfies a relationship of |ωre_v|≥ωa (No is determined in Step 6), after the completion of the setting of the q axis current limit value Iq_max and the voltage limit starting q axis current Iq_max_0, operation proceeds to step S10. In step S10, the current vector controlling section 1 compares, in the range of |ωre_v|≥ωa in which the q axis current limit value Iq_max is lower than or equal to the current limit value $I_{0max}$, the absolute value |iq*| of the q axis current command value with the value of the q axis current limit value Iq_max. If a relationship of |iq*|>Iq_max is determined, the limit processing is performed in step S11 to limit the q axis current command value iq* so as not to exceed Iq_max. In step S12, the absolute value |iq*| of the q axis current command value is compared with the voltage limit starting q axis current value Iq_max_0, and if a relationship of |iq*|<Iq_max_0 is found, the d axis current command value id* is set and output as id*=0 in step S14. On the other hand, if a relationship of |iq*|≥Iq_max_0 is determined, the value of id* which is needed depending on the voltage constraint is calculated in step S13 based on the iq* by Equation (18) as follows.

[Equation 18]

$$i_d^* = -(Ke/pL) + \sqrt{\{V_{0max}/(\omega_{re\_v}L)\}^2 - (i_q^*)^2} \quad (18)$$

The d axis current command value id* and the q axis current command value iq* determined using the above-described computation algorithm shown in FIG. 2 are coordinate values of the operating point which is determined based on the voltage limit circle and the current limit circle on the current vector limit chart of FIG. 10 in consideration of the voltage change so as to yield the maximum output torque with the highest degree of efficiency. The command values id* and iq* are output from the current vector controlling section 1 shown in FIG. 1.

Although the computation algorithm in this embodiment includes square operations and operations to extract square root in some of the equations, there is almost no increase in an operation processing load, because actual operations may be performed with an arcsine function ($\theta = \sin^{-1}x$) table and a cosine function ($y = \cos\theta$) table which are previously created. For example, taking $x = i_{dab}/I_{0max}$, the value of iqab in Equation 13 may be obtained by computing $\theta = \sin^{-1}x$, and then computing $i_{qab} = I_{0max} \cdot \cos\theta = I_{0max} \cdot y$.

FIG. 3 to FIG. 9 show graphs which mainly represent responses of the current vector controlling section obtained by inputting, into the velocity controller according to the embodiment shown in FIG. 1, a velocity command value ωm* obtained through quadratic acceleration/deceleration processing. The horizontal axis corresponds to a time axis expressed with the number of samplings for each sampling time Ts=0.1 [ms]. Parameters of the motor and the PWM inverter applied include the number of pole pairs p=4, the winding inductance L=2.35 [mH], the winding resistance R=0.2 [Ω], the induced voltage constant Ke=0.764 [V/(rad/s)], the DC bus (reference) voltage of Vdc=283 [V], the (reference) voltage limit value $V_{0max}$=175 [V], the current limit value $I_{0max}$=124 [A], and the electrical angular velocity parameters ωa=504, ωb=800, and ωc=918. In addition, a peak speed vm*max of the velocity command value ωm* is specified as vm*max=2500 [min$^{-1}$] with respect to a motor rated speed of 2000 [min$^{-1}$].

Figure 3:
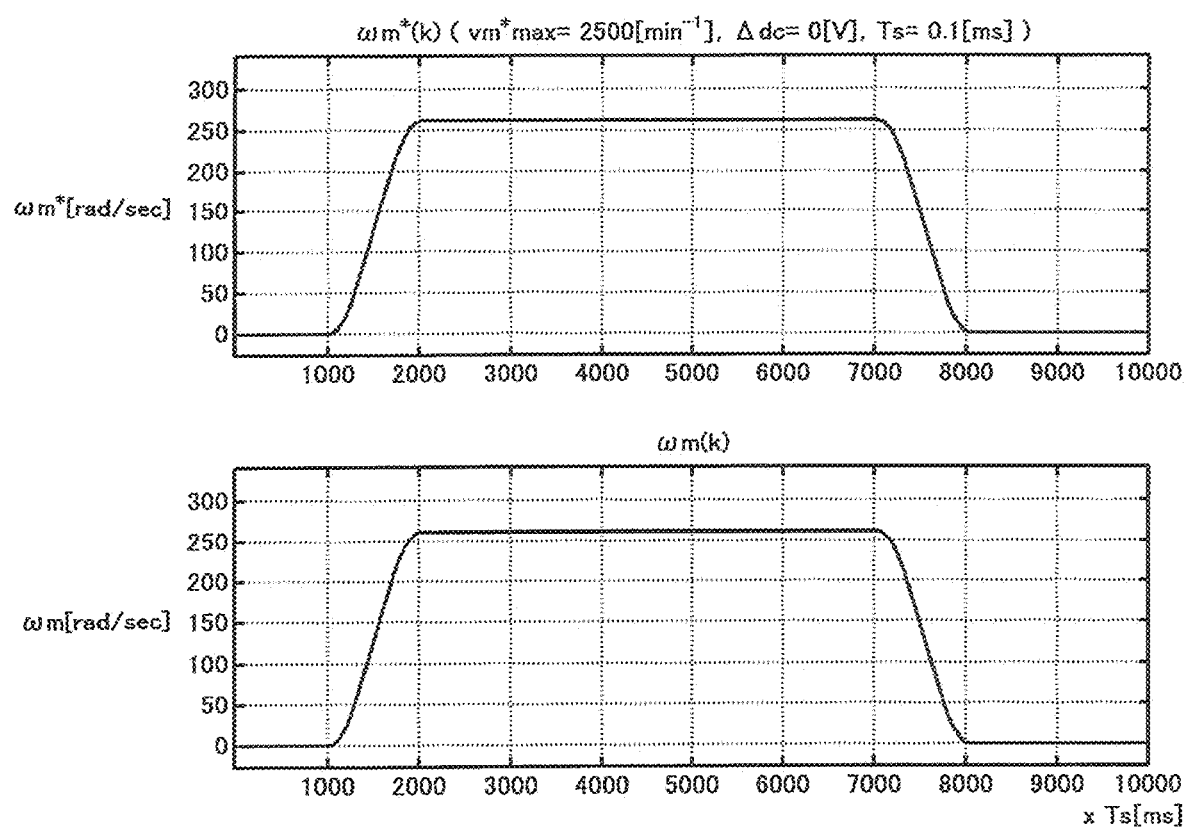
FIG. 3 is a graph showing as one example a velocity command value obtained in the controller and a motor velocity (in a case where Δdc=0)
Figure 4:
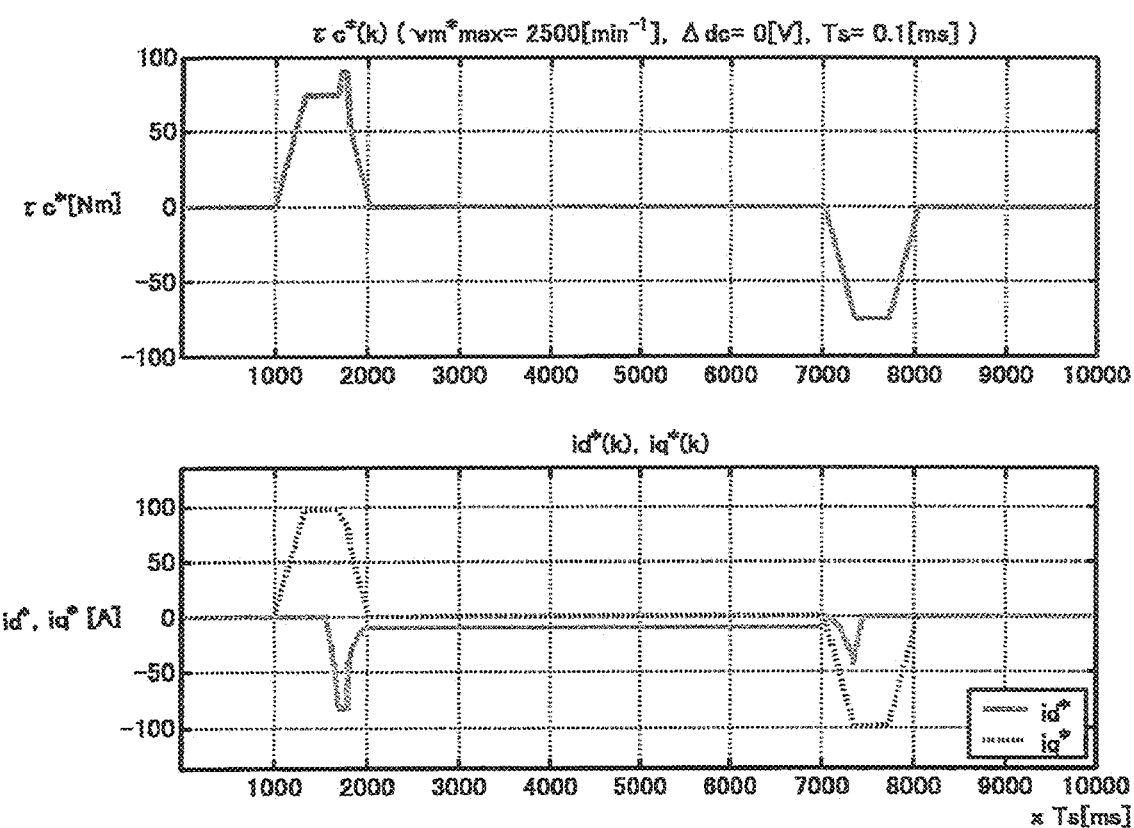
FIG. 4 is a graph showing as one example a torque command value, a q axis current command value, and a d axis current command value obtained in the controller (in a case where Δdc=0)
Figure 5:
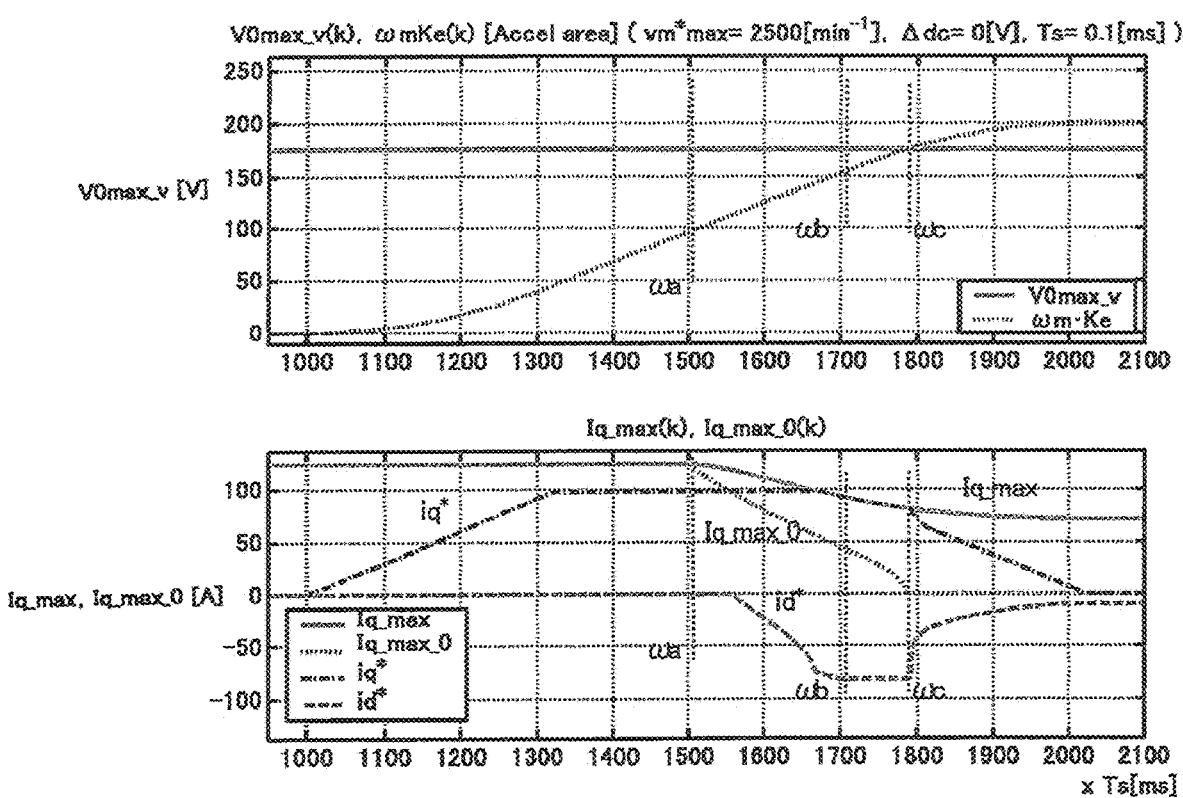
FIG. 5 is a graph showing as one example an internal operation performed at the time of acceleration by a current vector controlling section in the controller (in a case where Δdc=0)
Figure 6:
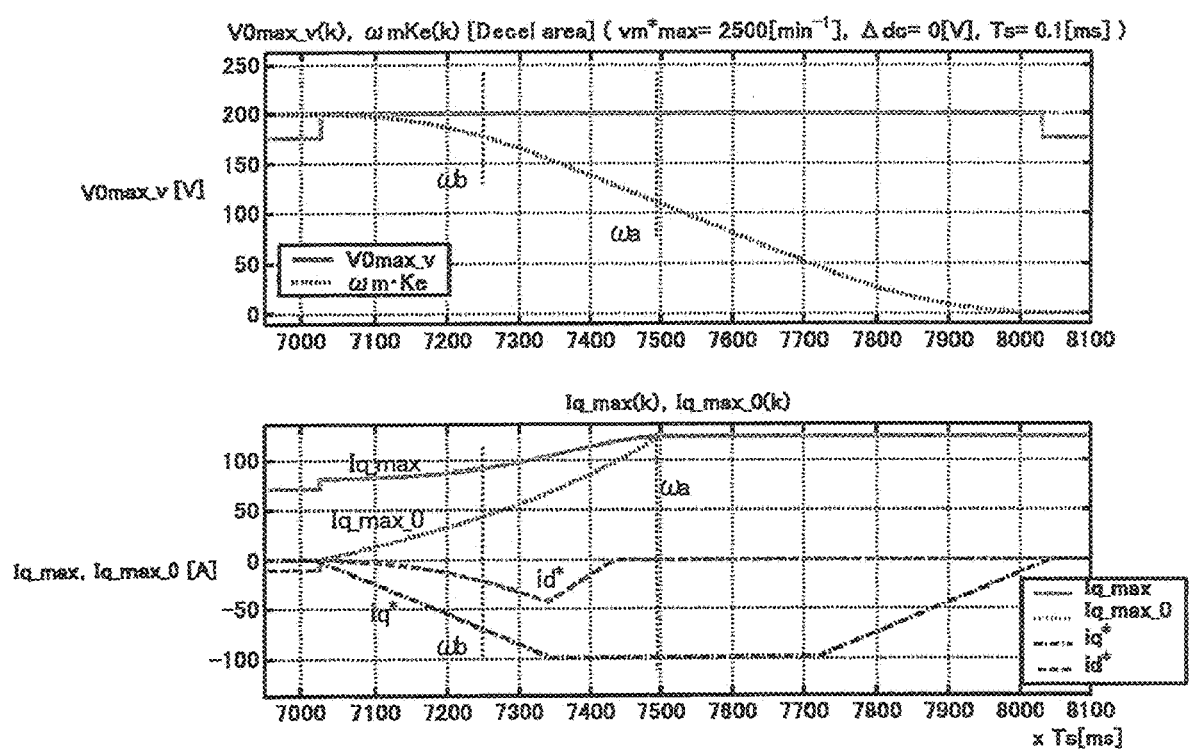
FIG. 6 is a graph showing as one example an internal operation performed at the time of deceleration by the current vector controlling section in the controller (in a case where Δdc=0)

In FIG. 3 to FIG. 6, the graphs represent the responses obtained in a case of the detected DC bus voltage change value Δdc=0 [V]. FIG. 3 shows the velocity command value ωm* and the motor velocity ωm, and FIG. 4 shows the torque command value τC*, the d axis current command value id*, and the q axis current command value iq*. Further, FIG. 5 shows the internal responses of the current vector controlling section in an acceleration region, and FIG. 6 shows those in a deceleration region. Specifically, FIG. 5 and FIG. 6 show, as parameters indicative of the internal responses, changes in the voltage limit value $V_{0max\_v}$, the induced voltage ωmKe, the q axis current limit value Iq max, the voltage limit starting q axis current Iq_max_0, the d axis current commend value id*, and the q axis current command value iq*. In a final stage of acceleration, the q axis current command value iq* is limited to the value of Iq_max, while, in the deceleration region, because the regenerative state is established, the voltage limit value $V_{0max\_v}$ is increased, leading to a linear response without limiting the q axis current command value iq*.

It should be noted that although the electrical angular velocity parameters (ωa, ωb, and ωc) are constant values, because each of the values indicates a timing of matching the electrical angular velocity ωre_v in the graphs, the values converted into the motor velocity ωm (=ωre/p) do not agree between power running operation and generative operation (graphs in FIG. 5 and FIG. 6) in which the voltage limit vales $V_{0max\_v}$ differ from each other.

Figure 7:
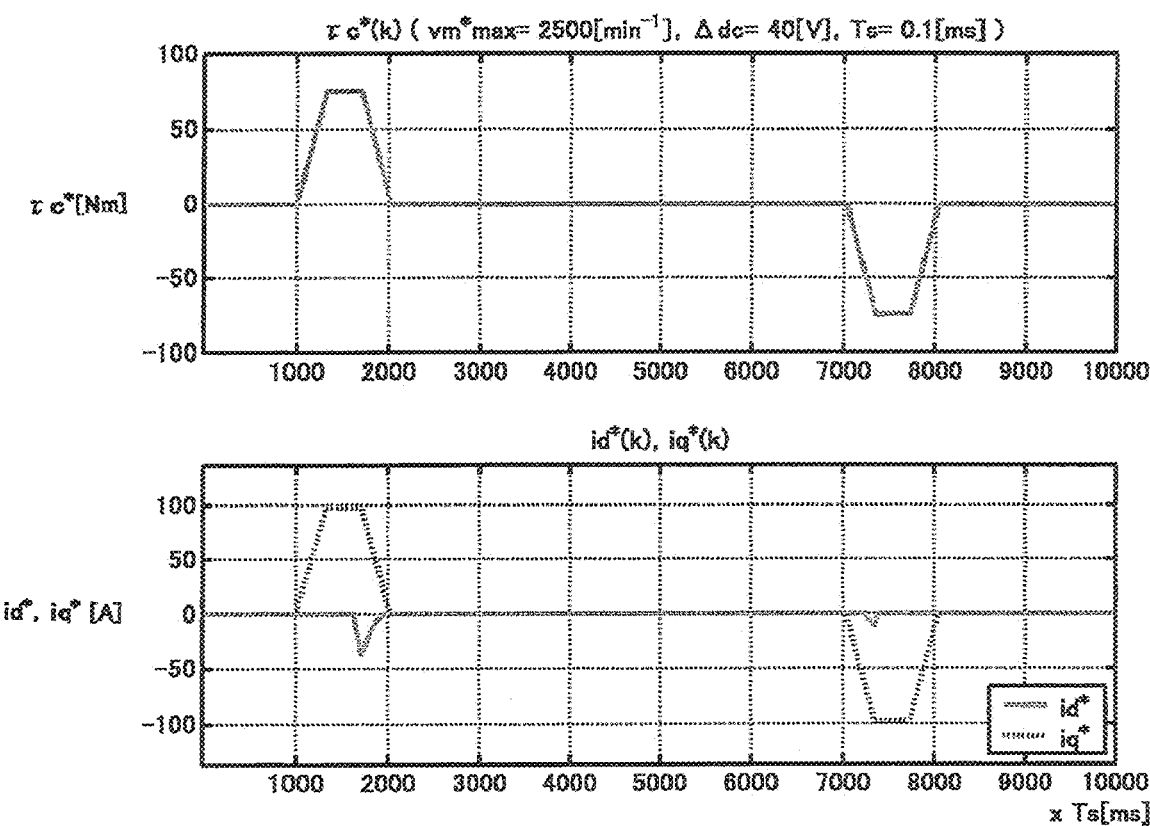
FIG. 7 is a graph showing as one example the torque command value, the q axis current command value, and the d axis current command value obtained in the controller (in a case where Δdc>0)
Figure 8:
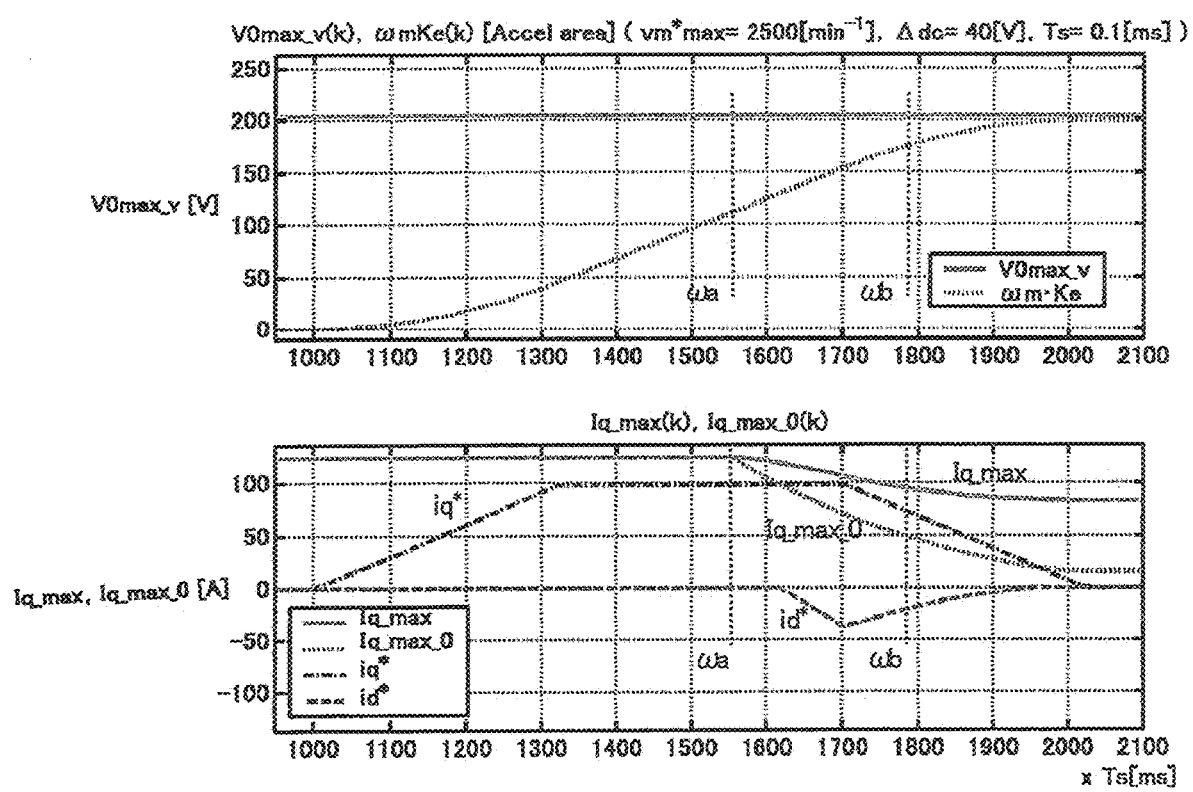
FIG. 8 is a graph showing as one example an internal operation performed at the time of acceleration by the current vector controlling section in the controller (in a case where Δdc>0)
Figure 9:
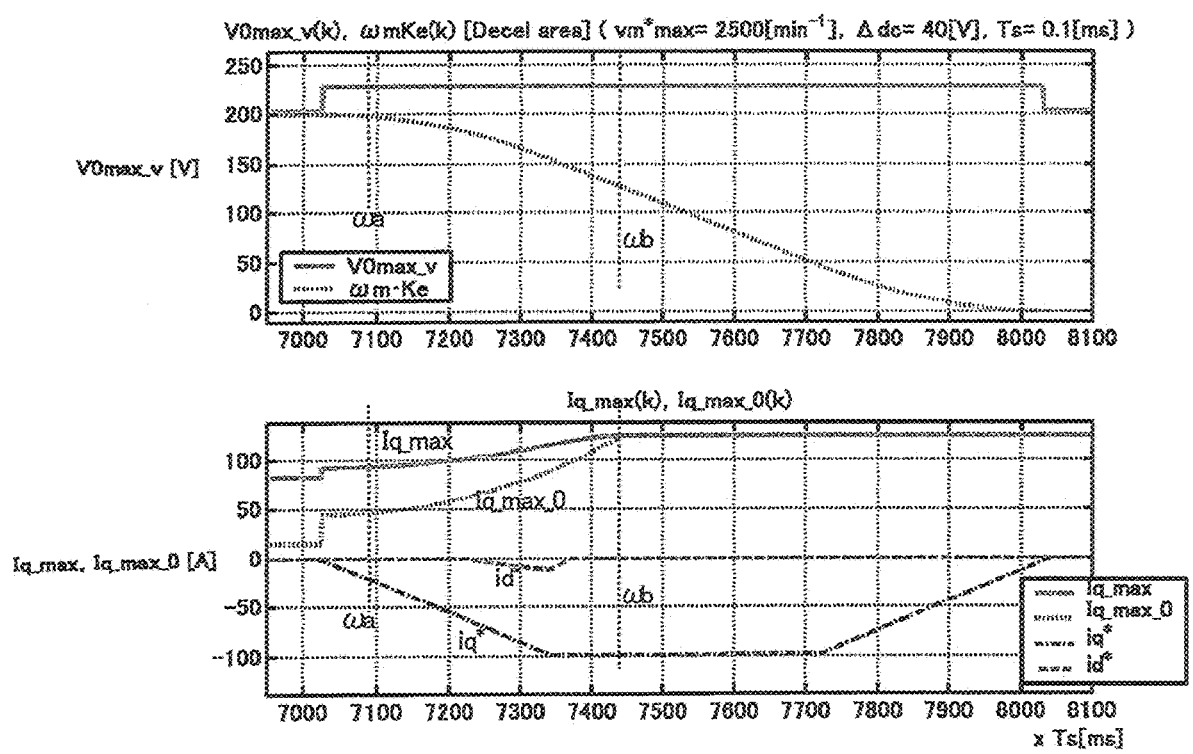
FIG. 9 is a graph showing as one example an internal operation performed at the time of deceleration by the current vector controlling section in the controller (in a case where Δdc>0)

FIG. 7 to FIG. 9 are graphs representing the responses obtained in a case of the detected DC bus voltage change value Δdc=40 [V]. The velocity command value ωm* is the same as that in FIG. 3. The graph in FIG. 7 corresponds to the graph in FIG. 4, and the graphs in FIG. 8 and FIG. 9 correspond to the graphs in FIG. 5 and FIG. 6, respectively. In the graphs of FIG. 7 to FIG. 9, because the increased DC bus voltage creates a voltage allowance, the q axis current limit value Iq_max is increased by the amount of the voltage allowance, with a result that the linear response can be obtained even in the acceleration region without causing the value of iq* to be limited to the value of Iq_max.

REFERENCE SIGNS LIST

1 current vector controlling section 10, 200 velocity controller; 50, 58, 59 subtracter; 51, 56 differentiator; 52 velocity control unit; 53 torque current converter; 54 DC bus voltage detecting section; 55 converter; 57 three phase→dq converting section; 60 current controlling unit; 61 dq→three phase converting section; 62 PWM signal computing section; 100 three-phase AC power source; 101 converter section; 102 large capacitor; 103 inverter section: 104 three-phase permanent magnet synchronous motor (motor), 105 position detector; 106u, 106w current detector.

The invention claimed is:

1. A motor controller wherein a current supplied through an inverter to a motor is computed using a two-phase rotating coordinate system, the motor controller comprising:
   a q axis current calculator which calculates a q axis current value in accordance with a torque command value; and
   a current vector controller which computes a q axis current command value and a d axis current command value based on the q axis current value, a velocity of the motor, and a DC bus voltage of the inverter; wherein
   the current vector controller is configured to
      determine, based on the velocity of the motor and the DC bus voltage, a voltage limit circle representing, on a d-q plane, current limit values defined by a voltage constraint resulting from the DC bus voltage,
      calculate a q axis current limit value based on both the voltage limit circle and a previously determined current limit circle representing, on the d-q plane, current limit values defined by a current constraint of the motor,
      determine, as a q axis current command value, a value obtained through limit processing which is applied using the q axis current limit value to the q axis current value calculated in the q axis current calculator, and
      determine a corresponding d axis current command value based on the q axis current command value.

2. The motor controller according to claim 1, wherein the current vector controller is further configured to determine, as the q axis current limit value, a q axis coordinate value having a greatest absolute value among those of q axis coordinate values contained in an internal region defined by an overlap between the voltage limit circle and the current limit circle.

3. The motor controller according to claim 2, wherein the current vector controller is further configured to determine, as the d axis current command value, a d axis coordinate value of a point in the internal region, the point whose q axis coordinate value matches the q axis current command value obtained through the limit processing and whose d axis coordinate value has a smallest absolute value among those of d axis coordinate values contained in the internal region.

4. The motor controller according to claim 1, wherein the current vector controller is further configured to:
   multiply an electrical angular velocity of the motor by a rate of change in the voltage constraint resulting from a change in the DC bus voltage to obtain an electrical angular velocity in which the change in voltage is considered, and
   determine the voltage limit circle based on the electrical angular velocity obtained in consideration of the change in voltage.

5. The motor controller according to claim 4, wherein the current vector controller is further configured to previously store as a constant an electrical angular velocity parameter which represents the electrical angular velocity obtained in consideration of the change in voltage and causes an equation for calculating the q axis current command value and the d axis current command value to be changed.

6. The motor controller according to claim 5, wherein:
   the current vector controller is further configured to
      determine, based on both the voltage limit circle and the current limit circle, a voltage limit starting q axis current being a maximum q axis current value among those allowing a d axis current to be set to zero; and store a first electrical angular velocity parameter indicative of a smallest electrical angular velocity at which the voltage constraint is applied, a second electrical angular velocity parameter indicative of a smallest electrical angular velocity whose voltage limit circle is located within the current limit circle, and a third electrical angular velocity parameter indicative of a smallest electrical angular velocity at which the voltage limit starting q axis current becomes zero; and the current vector controller determines, as the q axis current limit value, the current limit value defined by the current constraint of the motor when an absolute value of the electrical angular velocity obtained in consideration of the change in voltage is smaller than a value of the first electrical angular velocity parameter, determines, as the q axis current limit value, a q axis coordinate value of a point of intersection of the current limit circle and the voltage limit circle, and determines, as the voltage limit starting q axis current, a q axis coordinate value of a point of intersection of the voltage limit circle and a q axis when the absolute value of the electrical angular velocity obtained in consideration of the change in voltage is greater than or equal to the value of the first electrical angular velocity parameter and smaller than a value of the second electrical angular velocity parameter, determines, as the q axis current limit value, a q axis coordinate value of a point of intersection of the voltage limit circle and a voltage center line which passes through the center of the voltage limit circle in parallel with the q axis, and determines, as the voltage limit starting q axis current, a q axis coordinate value of the point of intersection of the voltage limit circle and the q axis when the absolute value of the electrical angular velocity obtained in consideration of the change in voltage is greater than or equal to the value of the second electrical angular velocity parameter and smaller than a value of the third electrical angular velocity parameter, and determines, as the q axis current limit value, the q axis coordinate value of the point of intersection of the voltage limit circle and the voltage center line, and sets zero as the voltage limit starting q axis current when the absolute value of the electrical angular velocity obtained in consideration of the change in voltage is greater than or equal to the value of the third electrical angular velocity parameter.

* * * * *